July 28, 1942. E. T. LESSIG 2,291,086
APPARATUS FOR TESTING FILAMENTARY OR STRIP ARTICLES
Filed Dec. 31, 1940
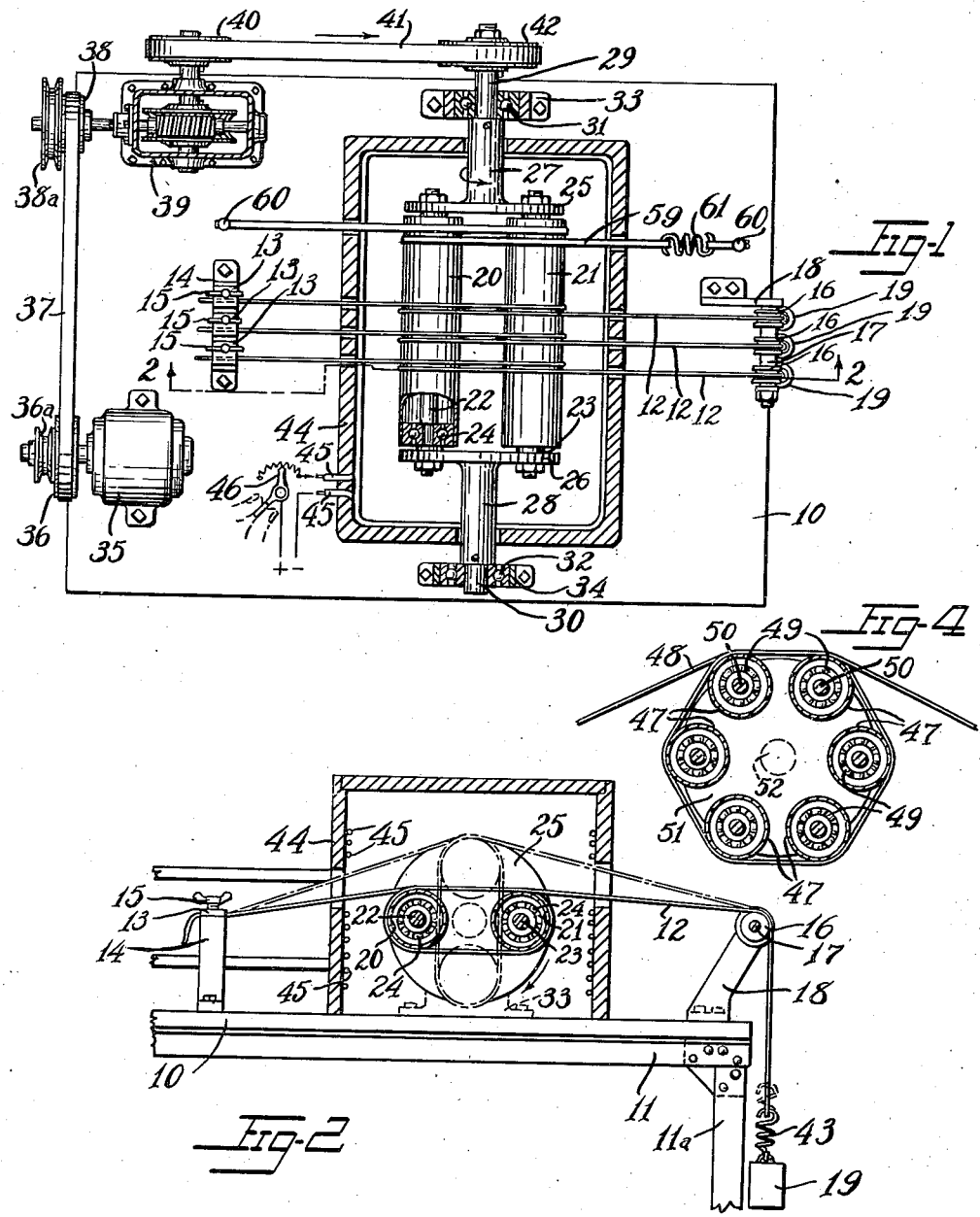
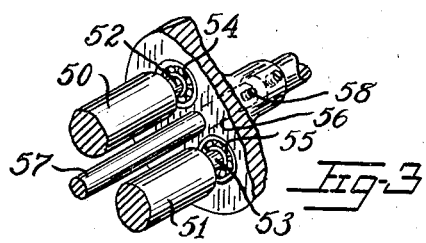
Inventor
Edward T. Lessig
By Willis F. Avery
Atty Patented July 28, 1942

2,291,086

UNITED STATES PATENT OFFICE 2,291,086

APPARATUS FOR TESTING FILAMENTARY OR STRIP ARTICLES

Edward T. Lessig, Silver Lake, Ohio, assignor to The B. F. Goodrich Company, New York, N. Y., a corporation of New York Application December 31, 1940, Serial No. 372,467

4 Claims. (Cl. 73—51)

This invention relates to the testing of filamentary or other articles in flexible strip form, and especially to apparatus for testing the resistance of such articles to cyclic bending fatigue.

In selecting material such as cord, wire, etc., suitable for use as reinforcement in tires, transmission belting and the like, or other flexible strip articles, it is desirable that testing methods and apparatus, adapted to facilitate such selection, set-up a type of stress in the article comparable to the stress or stresses actually to be encountered in the constructions as used. Stresses found in filamentary articles when applied to tire and transmission belt construction often are bending stresses and these are often accompanied by some vibration effects.

The chief objects of the present invention are to provide improved testing apparatus adapted to subject flexible filamentary or strip articles to cyclic bending stresses, and to provide apparatus for obtaining uniformly accurate and reliable test results on the bending fatigue of such articles.

A more specific object is to provide testing apparatus for such articles, comprising one or more, preferably a plurality, of rotatable members upon which the article may be supported, preferably by being looped about the members, such members being each rotatable about its own axis and all being rotatable about a common axis intermediate the members in a manner such that the article so placed is subjected to cyclic bending stresses.

Other objects are to provide means whereby the magnitude of bending stresses set-up in the article being tested may be varied in line with the magnitude of the bending stresses to be encountered in the article when in use; to provide for the testing of a plurality of the articles simultaneously and to provide for ease and convenience of operation and maintenance.

These and further objects will be apparent from the following description, reference being had to the accompanying drawing in which:

Fig. 1 is a plan view of apparatus constructed in accordance with and embodying the invention in its preferred form, parts being broken away and sectioned.

Fig. 2 is a section taken along the line 2—2 of Fig. 1, parts being broken away.

Fig. 3 is a view in cross-section of a modified construction.

Fig. 4 is a view in cross-section of a further modified construction.

Apparatus constructed in accordance with the invention is shown in Figs. 1 and 2 of the drawing. The apparatus is preferably constructed on a substantially horizontal table 10 and supported at the desired working height by a frame 11 and frame supporting members 11a which are desirably of sufficiently heavy construction to provide adequate rigidity. While the horizontal arrangement is preferred, the apparatus of the invention lends itself to an inclined or even a vertical disposition, if desired.

A plurality of filamentary articles 12, 12, three in the form of the invention shown, are secured as by means of independently operated plate clamps 13, 13 mounted on a supporting post 14 bolted to the table 10. The plate clamps 13, 13 may be raised and lowered to engage and disengage the cord or wire 12, 12 by means of thumb screws 15, 15. Although this clamping means is preferred, because of its convenience, any other suitable means may be used, if desired.

The articles to be tested 12, 12 extend unbrokenly in looped-about relation over rotatable members which will be more fully described hereinafter; and over pulleys 16, 16 mounted on a shaft 17 and supported by a bracket 18 bolted to the table 10. Alternatively, a roller or even suitable non-rotatable members may be employed in place of the pulleys 16, 16. Weights 19, 19 attached to the test specimens 12, 12 are of a magnitude consistent with the amount of tension desired in the cord or wire 12, 12 being tested. For different tests the tension may be varied between a relatively small amount and the ultimate tensile strength of the material being tested.

Intermediate the clamps 13, 13 and the pulleys 16, 16 the cords or wires, etc., 12, 12 are looped about a plurality of rollers or other rotatable members as mentioned hereinabove. The apparatus shown in Figs. 1 and 2 comprises two rollers 20 and 21 rotatably mounted on shafts 22 and 23 by means of suitable anti-friction bearings as indicated at 24 in conjunction with one end of roller 20 and shaft 22. The shafts 22 and 23 are bolted or otherwise secured at each end to vertical plates or spiders 25 and 26 adapted to support the shafts 22 and 23 on the rollers 20 and 21 in fixed positons relative to each other. The spiders 25 and 26 incorporate sleeves 27 and 28 in which shafts 29 and 30 are keyed, fastened by means of set screws or otherwise secured in non-slip relation. The shafts 29 and 30, the sleeves 27 and 28 and the spiders 25 and 26 are rotatably mounted on suitable anti-friction bearings 31 and 32 contained in supporting members 33 and 34 which are bolted to the table 10. If desired, a single shaft may be adapted to extend through both spiders and keyed to each, or the spiders may be otherwise suitably mounted rotatively.

Any suitable source of power may be utilized and may be applied in the operation of the apparatus in any manner desired, as for example by the means shown in Fig. 1 of the drawing. As shown here, power is supplied by an electric motor 35 by means of sheaves 36 and 38 through a transmission belt 37 to a speed reduction unit indicated generally at 39. Power is transmitted from the speed reduction unit 39 through sheaves 40 and 42 and a belt 41 to the shaft 29. An alternative set of sheaves 36a and 38a or any suitable combination of sheaves may be used for power transmission between the motor 35 and the unit 39 whereby a variety of speeds of rotation may be made available at the testing apparatus.

In the operation of the testing apparatus of the invention, the rollers are revolved about a common axis intermediately of the rollers. The filamentary articles being tested are looped about the rollers one or more times. One turn of the loop as shown in the drawing has been found suitable for most cases. When the rollers are revolved, the portion of cord or wire looped about the rollers is subjected to bending cyclically and adjacent increments of the cord or wire are bent consecutively and cyclically as the rollers are revolved. The rollers, being mounted on anti-friction bearings, are rotated by the cord or wire without objectionable slip so that undesirable rubbing between the cord or wire and the rollers and the possibility of wear on the cord or wire is avoided.

Cylindrical rollers, as shown in the form of the invention of the drawing, provide for substantially uniform bending of the filamentary articles being tested. The sharpness of bending may be increased by reducing the diameter of the rollers used, since the curvature of the rollers, for a given arrangement, determines the arc of bending. If a test is desired that subjects the cord or wire to non-uniform bending other suitable shapes of rollers may be used, as for example rollers of oval or polygonal shape in cross-section. Also, if a frictional wear test is desired in combination with the cyclic bending test, the rotatable rollers may be replaced with non-rotatable rollers or other suitable non-rotatable members without requiring substantial changes in the apparatus as hereinabove described.

In the bending of the filamentary articles as accomplished by the apparatus of the invention, stresses will exist throughout the cross-section of the cord varying in a manner depending upon the location of the neutral axis. In a test, therefore, a tendency is induced in the fibers or particles of the filamentary article to work against adjacent fibers or particles and this effect in combination with the stretching and relaxing of the fibers or particles and their bonds under the cyclic bending results in conditions of stress and heating similar to those encountered in the cord or wire when applied to certain constructions such as tires, belts, etc.

A spring 43 may be suspended between the cord or wire 12, 12 and the weight 19 as shown in Fig. 2 of the drawing, desirably of such spring rate or frequency as to absorb possible excessive vibration or reciprocating motion in the cord or wire 12, 12 and thereby further add to the uniformity and smoothness of the stresses applied to specimens in a test.

An insulated heating chamber of any suitable construction, as for example the box-like construction 44 as shown in Figs. 1 and 2 of the drawing, may be mounted over the rollers in a manner such that heat may be applied about the cord or wire throughout the test comparable to that existing in structures for which the cords or wires are intended. The elevated temperatures are preferably imposed on the filamentary articles locally at the rollers in a manner such that the portions of the reaches of the articles at the clamps and pulleys are not subjected to the elevated temperature. Suitable apertures are provided in the side walls of the heating chamber to permit passage of the articles being tested therethrough. Electrical heating elements 45, 45 are preferred and may be disposed within the heating chamber 44 and connected to a suitable source of electric current through a rheostat as indicated at 46 in Fig. 1.

If it is desired to subject filamentary articles to more intensive bending stresses, or even compressive stresses, for testing purposes, rollers of relatively small diameter may be used so that the arc of bending may be sufficiently small so that the portion on the inner part of the arcs of the bent articles will be compressed periodically.

A modified form of the invention comprises a pair of relatively small diameter rollers 50 and 51 disposed as close together as is practicable and mounted on shafts 52 and 53 which may be rotatably mounted in relatively small bearings 54 and 55 disposed in the spider 56 as shown in Fig. 3 of the drawing. A rod 57 extending between the spiders and secured by suitable holding means, as for example by set screws as 58, in each spider, may be desirable to supplement the rollers in transmitting rotary motion from the drive spider to the driven spider. The modified form of apparatus is adapted to subject filamentary articles, especially cord, to differential cyclic bending stresses comprising tensile stresses in the fibers outwardly in the cord from the center of the arc of bending and compressive stresses in the fibers of the cord inwardly in the cord toward the center of the arc of bending. By the use of this modified apparatus, tests may be made simulating differential stresses in cords as they exist in the cords in certain types of structures.

In testing filamentary articles, especially wire and the like, it may be desirable to subject the wire to a relatively small degree of bending. In tests of this type the apparatus of the invention may be modified by the use of a plurality of rollers, as for example six rollers as shown in Fig. 4. Rollers 47, 47 are adapted to receive an article to be tested 48 in looped-about relation and are independently mounted on anti-friction bearings 49, 49 on shafts 50, 50. The shafts 50, 50 are bolted or otherwise secured to a spider 51 rotatably mounted on a shaft 52 and the remainder of the apparatus is substantially the same as in the preferred form as hereinbefore described.

The larger number of rollers in this modification provide a reduction in the length of the arc of bending over that of the two roller embodiment inasmuch as the article being tested is here looped about a relatively small portion of the circumference of each of six rollers rather than substantially one-half of the circumference of each of two rollers, and relatively larger diameter rollers are often desirable in this modification to provide a reduced sharpness in the arc of bending of the article being tested.

The elongated rollers of the invention are adapted to receive a relatively large number of test specimens simultaneously in side by side spaced-apart relation, which results in a substantial saving of time in testing filamentary articles and makes for convenience in making comparative tests.

Auxiliary means to assist in the rotation of the rollers as they are revolved about an intermediate axis may be useful in some cases such as where metallic articles or a single cord article are being tested. Such means may, for example, comprise one or more straps, as 59, of fabric, rubber or other suitable material disposed in looped relation about the rollers at the end portions thereof in the position indicated at 59 in Fig. 1, so as not to interfere with the articles being tested, the ends of such straps being clamped or otherwise suitably fastened to the table as shown at 60, 60. A tensile force may be applied to the strap 59 as, for example, by a spring 61, shown in Fig. 1, or a suitable weight. Apertures are provided in the walls of the heating chamber to permit passage of the straps therethrough. The disposition of the auxiliary straps on the roller is similar to that of the articles being tested.

The rollers or other rotatable members may be constructed of any suitable material. Metal such as steel, aluminum, etc., has been found suitable for most applications. Where additional friction on the roller surface is desired, a suitable friction-increasing surface may be added, in the form, for example, of fabric, rubber or other suitable composition or material, to the end that slip between a test specimen and the rotatable members will be reduced or eliminated.

While the invention will probably find its most extensive use in testing filamentary articles such as wire, cord and the like, including cords of rayon and other material as well as cotton, the invention is useful also in the testing of other flexible strip material than filamentary articles, for example, strips of fabric rubber, leather, and other material.

Variations may be made without departing from the scope of the invention as it is defined by the following claims.

I claim:

1. Apparatus for imposing cyclic bending stresses on a flexible filamentary or strip article substantially without rubbing action on the article, for the purpose of testing the resistance of the article to bending fatigue, said apparatus comprising means for supporting a reach of the article, means for applying tension to said reach, a plurality of members rotatable about spaced-apart axes and mounted between the supporting means and the tensioning means for receiving an extensive intermediate portion of said reach in a complete loop about said members, and means for rotating said members as a group about an axis intermediate said spaced-apart axes to flex continuously the looped portion of the tensioned reach.

2. Apparatus for imposing cyclic bending stresses on a flexible filamentary or strip article substantially without rubbing action on the article, for the purpose of testing the resistance of the article to bending fatigue, said apparatus comprising means for supporting a reach of the article, a plurality of members rotatable about spaced-apart axes and mounted for receiving an extensive intermediate portion of said reach in a complete loop about said members, means for rotating said members as a group about an axis intermediate said spaced-apart axes to flex continuously the looped portion of said reach, and means disposed at a side of said members opposite to the supporting means for applying substantially constant tension to said reach comprising a weight and a spring connection between said weight and the article.

3. Apparatus for imposing cyclic bending stresses on flexible filamentary or strip articles substantially without rubbing action on the articles, for the purpose of testing the resistance of the articles to bending fatigue, said apparatus comprising means for supporting reaches of a plurality of the articles in side-by-side relation, a plurality of elongated members, anti-friction bearings supporting said members for rotation about spaced-apart axes in a position to receive extensive intermediate portions of said reaches in complete loops about said members, means for rotating said members as a group about an axis intermediate said spaced-apart axes to flex continuously the looped portions of said reaches, and means disposed at a side of said members opposite to the supporting means for applying tension to said reaches individually.

4. Apparatus for imposing cyclic bending stresses on flexible filamentary or strip articles substantially without rubbing action on the articles, for the purpose of testing the resistance of the articles to bending fatigue, said apparatus comprising means for clamping the articles to support a plurality of reaches thereof in side-by-side relation, a plurality of elongated members, anti-friction bearings supporting said members for rotation about spaced-apart axes in a position to receive extensive intermediate portions of said reaches in complete loops about said members, means for rotating said members as a group about an axis intermediate said spaced-apart axes to flex continuously the looped portions of said reaches, and means disposed at a side of said members opposite to the supporting means for applying substantially constant tension to said reaches comprising an individual weight for each reach and a spring connection between each weight and the article.

EDWARD T. LESSIG